H. FISHER.

HARVESTER.

No. 3,349. Reissued Mar. 30, 1869.

Witnesses:

Franklin Small

Geo. E. Buckley.

Inventor:

Jos Harding atty for C Cauldwell

United States Patent Office.

C. AULTMAN, OF CANTON, OHIO, ASSIGNEE, BY MESNE ASSIGNMENTS, OF HENRY FISHER.

*Letters Patent No.* 41,411, *dated January* 26, 1864; *reissue No.* 3,349, *dated March* 30, 1869.

IMPROVEMENT IN HARVESTERS.

The Schedule referred to in these Letters Patent and making part of the same.

*To all whom it may concern:*

Be it known that HENRY FISHER, of Alliance, in the county of Stark, and State of Ohio, did invent certain new and useful Improvements in Harvesters; and that the same are described and represented in the following specification and drawings.

The nature of his inventions and improvements in harvesters consists in connecting the rake or rakes which reel or sweep the grain to the cutters, and rake it from the platform, to a revolving vertical hub, attached to a crown-wheel, so that each arm can vibrate independent of the others, and guiding the rakes, as they are revolved, by a stationary grooved cam-way, acting on the rear end of the rake-heads, behind the fulcra on which they vibrate; and in attaching the rake-arms to the head, so that they shall approach and cross the cutter-bar nearly parallel to its front; and in arranging an arm, or sweep in front of the rake, for reeling, or sweeping the grain to the cutters in advance of the rake.

To enable others skilled in the art to make and use the said improvements, the following description of their construction and operation is given, referring to the accompanying drawings, in which the same letters indicate like parts in each of the figures.

In the above-mentioned drawings—

A is the platform of the harvester, mounted on the wheels B, C, and D, the latter being a caster-wheel, to facilitate the turning of the harvester.

B is the driving-wheel, provided with a pulley, R, on the inner side of the driving-wheel B, for the band E, which drives the pulley F and shaft C, carrying the mitre-pinion H, which drives the gear I, and vertical shaft J, which carries the rakes, or rake and sweeps K K. One of the rake-heads may be used without teeth, as a sweep, to reel the grain to the cutters.

The shafts C and J are arranged to turn in proper boxes, and the rake-heads K K vibrate on pivots on the head, or hub on top of the mitre-wheel, independent of each other.

Figure 4:
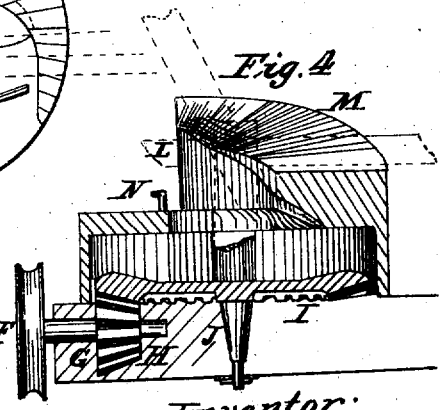
Figure 4 is a section on the line X X of fig. 2.

These radial arms K K extend back behind their fulcra, and pass into the groove L, in the stationary cam M, which is fastened to the platform A, and surrounds the hub, or cam-wheel, and protects the gear I, as shown in section, fig. 4.

The cam M is made in the form shown in the drawing, so as to let the rake down near the front of the platform, and it passes around, sweeping the grain from the platform, when the rear end of the rake-head enters the groove L in the cam M, which raises the rake up nearly perpendicular, so as to pass the man which drives the horses; and as the rear end of the rake passes out of the groove, it passes on to the metal frame N, on the cam, which forces the rake down near the front edge of the platform, to sweep, or rake the grain, or gavel from the platform on to the ground.

Figure 1:
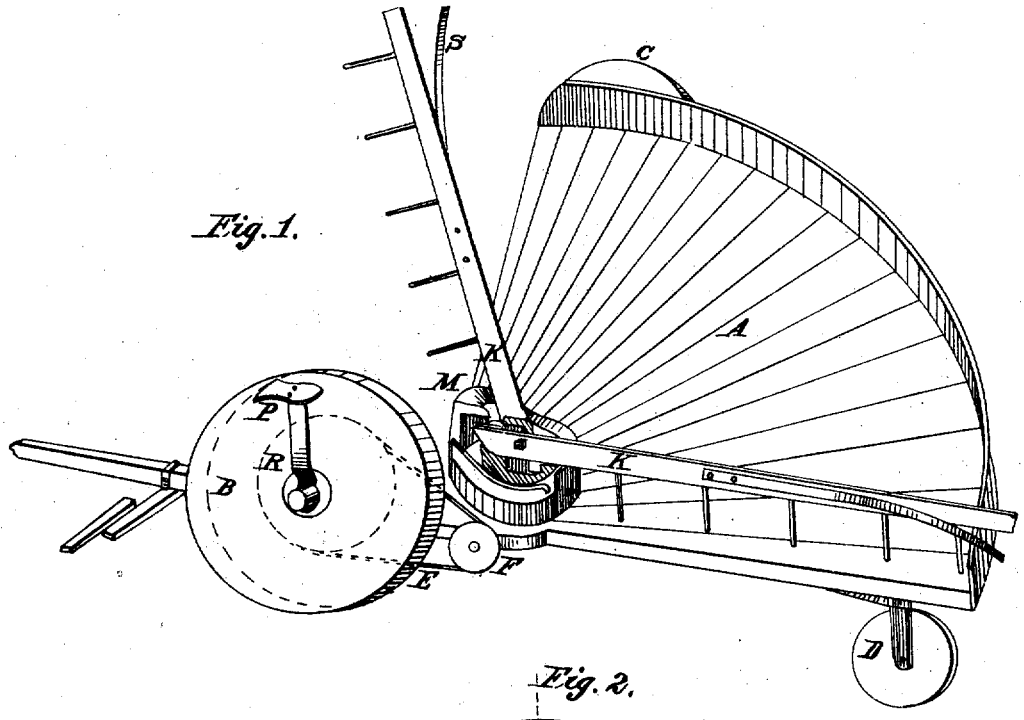
Figure 1 represents such parts of a harvester as are necessary to show his improvements.
Figure 2:
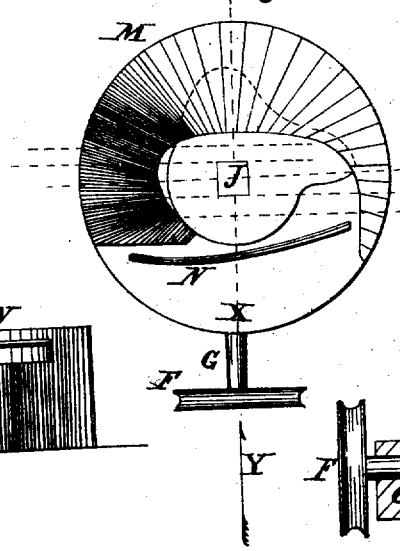
Figure 2 is a top view of the stationary cam-way.
Figure 3:
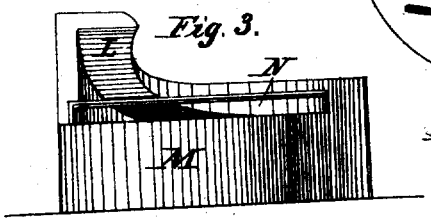
Figure 3 is a side view, seen in the direction of arrow Y.

P is the driver's seat, supported by an extension of the linchpin R, which holds the wheel B on its axle, as shown in fig. 1.

S is a curved arm, fastened to the side of the rake-head K, to reel or sweep down the grain in advance of the rake, and insure its being cut before the rake moves it on the platform.

Having thus described the said invention,

What is claimed, and desired to be secured by Letters Patent, is—

1. The combined raking and reeling-apparatus, which rotates around a vertical shaft, when its arms adjust themselves successively from a horizontal to a vertical position, and when the combined apparatus is so located that its arms swing on hinges, which are below the highest point of the drive-wheel, and the extent of the sweep of any one of the arms does not interfere with the driver, seated outside of the drive-wheel, substantially as described.

2. The construction and adaptation of a combined rake and reel, which revolves entirely around a vertical centre, so that it may be applied to the harvester at a point which is on the inside of the drive-wheel, and below the top of said wheel, substantially as described.

3. Attaching each of the respective arms of the combined rake and reel to a hinge, or pivot, which is on the inner side of the drive-wheel, and below the top of the same, substantially as described.

4. The adaptation of a raking and reeling-apparatus combined, which revolves entirely around a vertical centre, for application to the inner side of a harvester, at a point below the top of the drive-wheel, substantially as described.

5. The construction of the cam of the combined rake and reel, in the manner described and shown.

6. The crown-wheel, with a series of pivoted rake and reel-arms, in the manner described and shown.

7. Attaching the rake-arm to the central head, below the driving-wheel, and in a line tangential, instead of radial to the head, so as to cause the rake to pass the cutting-apparatus in a line more nearly parallel thereto.

8. So arranging the arms of a combined revolving raking and reeling-apparatus, that the driver can sit on the machine and drive the team, the shaft of the rake and reel being at, or nearly at right angles with the grain-platform, and the arms of rake and reel not sweeping over the seat on which the driver is located, so as not to interfere with him, substantially as described.

9. Driving a revolving rake and reel combined, mounted upon a vertical, or nearly vertical pivot, from a pulley on the inner side of the drive-wheel, or main axle.

10. The combination of a horizontal mitre-wheel, having combined rake and reel-arms attached thereto, a vertical mitre-spur wheel, and an endless belt, or its equivalent, extending to a pulley on the driving-wheel, or shaft.

11. A driver's seat, supported wholly on the outer end of the main drive-wheel axle.

12. In a harvesting-machine, the frame of which has no support outside the main drive-wheel, a driver's seat, mounted on a support which is wholly outside of said wheel.

13. In a harvester, having a revolving rake and reel, a driver's seat, supported by the outer end of the main axle.

14. In combination with the stationary cam M, extending the rake-head back behind its fulcrum, so as to raise and control the rotating rake by the action of the cam-way on its heel, or rear end, substantially as described.

15. In combination with the rake, the curved projection attached thereto, to push the grain down in advance of the rake, and insure its being cut before the rake shall move it on the platform.

C. AULTMAN.

Witnesses:
JOHN TONNER,
DAN'L TONNER.